United States Patent [19]

Adams et al.

[11] Patent Number: 4,485,131

[45] Date of Patent: Nov. 27, 1984

[54] ALKALINE AQUEOUS COATING SOLUTION AND PROCESS

[75] Inventors: Richard G. Adams, Audubon; Kurt Goltz, Exton; Frederick J. Spaeth, Downingtown, all of Pa.

[73] Assignee: Pennwalt Corporation, Philadelphia, Pa.

[21] Appl. No.: 472,310

[22] Filed: Mar. 4, 1983

[51] Int. Cl.$^3$ .............................................. B05D 3/02
[52] U.S. Cl. ............................ 427/388.2; 106/14.13; 427/388.4; 524/377; 524/505; 524/556
[58] Field of Search .................. 106/14.13; 427/388.2, 427/388.4; 524/505, 556, 377

[56] References Cited

U.S. PATENT DOCUMENTS

| | | | |
|---|---|---|---|
| 3,297,616 | 1/1967 | Fisher, Jr. et al. | 106/14.13 X |
| 3,849,208 | 11/1974 | Marosi | 148/6.27 |
| 4,105,615 | 8/1978 | Balatan | 260/29.6 T |
| 4,136,075 | 1/1979 | Finn et al. | 260/29.6 TA |
| 4,166,882 | 9/1979 | Das et al. | 427/388.2 X |
| 4,243,416 | 1/1981 | Grourke et al. | 106/14.13 |
| 4,289,811 | 9/1981 | Shelly, Jr. | 427/388.2 X |
| 4,335,829 | 6/1982 | Christenson et al. | 220/458 |
| 4,351,883 | 9/1982 | Marcantonio et al. | 428/450 |
| 4,366,185 | 12/1982 | Tanaka et al. | 427/386 |

OTHER PUBLICATIONS

Carboset Resins, B. F. Goodrich Product Bulletin, GC-73.

Primary Examiner—Thurman K. Page

[57] ABSTRACT

Aqueous alkaline coating compositions for metal substrates comprising a water soluble salt of an acrylic polymer which contains carboxyl groups, a divalent metal ion, a volatile base and a defoamer. The acrylic polymer is present in the coating composition in an amount greater than about 0.25 gm/liter and less than about 5.0 gm/liter.

32 Claims, No Drawings

ALKALINE AQUEOUS COATING SOLUTION AND PROCESS

BACKGROUND OF THE INVENTION

This invention relates generally to corrosion-resistant coatings and more specifically to the formation of thin, clear, corrosion-resistant coatings on aluminum and black plate steel containers by crosslinking water soluble acrylic polymers, which contain carboxyl groups, with divalent metal ions.

Metals such as aluminum and its alloys are treated with materials to form coatings which provide corrosion and tarnish resistance to the metal surface. This is especially important in forming metal food and beverage containers. During the pasteurization process, the heat will cause the containers to discolor if they are not protected with a conversion coating. The coatings also act to improve the adherence of overlying coatings such as are formed from paints, inks, and lacquers. In the past, these coatings have been formed from acidic solutions of heavy metals. Currently aqueous coating solutions containing compounds of titanium, zirconium and/or hafnium, a strong mineral acid and fluorides are used. These solutions have the advantage of avoiding the use of materials such as chromates, ferricyanide or tannins but still employ fluorides. Many acidic coating systems have the disadvantage of producing overetched surfaces when the process is not carefully controlled. The container must also be carefully rinsed after coating and before drying. Fluoride-free alkaline container coating systems have also been disclosed which include silicate materials.

A problem occurs when preparing untinned steel containers for the application of protective coatings, because flash rust occurs during drying after the cleaning process.

Aqueous, alkaline solutions of acrylic resins which are crosslinked by divalent metal ions are known for use in forming water-borne, corrosion-resistant coatings but these coating compositions are unsuitable for forming clear, thin, uniform corrosion-resistant coatings on containers which will adhere to container coating lacquers.

We have now found an improved acrylic resin alkaline coating solution and process which is free of toxic materials, which permits the coated containers to be dried directly without rinsing, and which provides excellent corrosion protection and adhesion to coating lacquers.

BRIEF SUMMARY OF THE INVENTION

In accordance with this invention, there is provided an aqueous, alkaline coating composition comprising a water soluble salt of an acrylic polymer which contains carboxyl groups, a divalent metal ion which is effective to crosslink the polymer such as calcium, magnesium and mixtures thereof, a volatile base, and a defoamer. The acrylic polymer is present in the coating composition an amount greater than about 0.25 gm/liter and less than about 5.0 gm/liter.

Also provided is a process for forming a corrosion-resistant coating on a metal substrate comprising coating the surface of the metal substrate with an aqueous alkaline composition comprising a water soluble salt of an acrylic polymer which contains carboxyl groups, a divalent metal ion selected from the group consisting of calcium, magnesium and mixtures thereof, a volatile base and a defoamer. The acrylic polymer is present in the coating composition in an amount greater than about 0.25 gm/liter and less than about 5.0 gm/liter.

DETAILED DESCRIPTION

The aqueous, alkaline coating compositions or baths of the invention include salts of certain thermoplastic acrylic polymers which are crosslinked by divalent metal ions to form clear, colorless, corrosion-resistant coatings. Acrylic polymers, which are useful in the invention, include copolymers (including terpolymers) of methacrylic acid which contain from about 3 to 15 weight percent of carboxyl functionality. For example, thermoplastic terpolymers containing ethyl acrylate, methyl methacrylate and methacrylic acid having molecular weights in the range of from about 30,000 to 260,000, which are marketed under the trademark CARBOSET ® by B. F. Goodrich. The polymers are used in the form of water soluble salts by reacting them with ammonia or other volatile neutralizing agents. The polymers are used in concentrations to give a polymer solids content in the bath of greater than about 0.25 gm/liter, with a preferred range of from about 0.50 gm/liter to 2.5 gm/liter. At levels of 0.25 gm/liter or below, a uniform corrosion-resistant coating is not achieved. At levels of 5.0 gm/liter, the coating becomes hazy and is uneven so that the can appearance is distorted. Within the recited composition range, clear, uniform, corrosion-resistant coatings which will promote adhesion of water-based lacquers are obtained. At polymer solid levels of -to 30 percent, which have previously been recommended for other coating applications, corrosion resistance is maintained, but the appearance is unsatisfactory and water based lacquers which are normally used to coat containers will not wet and adhere to the coating surface.

The preferred volatile base or neutralizing agent is ammonium hydroxide which also forms a weak complex with the divalent metal ions. As the ammonium hydroxide evaporates during the drying process, the metal ions crosslink the polymer chains through the carboxyl groups to form the corrosion-resistant polymer coating. The ammonium hydroxide is generally used in amounts to provide in the coating baths from about 0.240 gm/liter to 2.0 gm/liter of $NH_3$ with a preferred range of from about 0.60 gm/liter to 1.20 gm/liter. Larger amounts of ammonium hydroxide could be used but are unnecessary and would add expense and odor to the coating compositions.

Suitable divalent metal ions which are effective to crosslink the acrylic polymer include calcium and magnesium. We have found that zinc and zirconium complexes are ineffective as crosslinkers in the dilute baths of the invention.

The metals are added to the baths in the form of soluble salts such as nitrates, sulfates, chlorides, acetates and formates. The metal ion concentration in the bath ranges from about 0.060 gm/liter to 0.452 gm/liter, (preferred 0.113 gm/liter to 0.282 gm/liter), for calcium ions and 0.018 gm/liter to 0.316 gm/liter, (preferred 0.113 gm/liter to 0.189 gm/liter), for magnesium ions. Amounts of metal ions which cause the coatings to become hazy should be avoided.

The pH of the baths ranges from about 8.5 to 11.0 with a preferred range of 10.0 to 10.5. Below pH 8.5, gelation can occur.

To improve the operation and coating qualities of the bath, a film forming aid, a solvent, and a defoamer are also employed. Suitable film forming aids include amines which will volatize at the coating drying temperatures such as dimethylaminoethanol, triethylamine and diethylethanolamine. The amines aid in providing an even, bubble-free coating and better appearance by improving the rheology of the deposited wet film layer. The film forming aid is preferably used in amounts to provide in the coating baths about 2.9 gm/liter to 5.8 gm/liter. Larger amounts of up to 47 gm/liter could be employed before coating failure occurs but provide no particular advantage.

Solvents are used to aid in wetting the metal surface and to reduce blushing of the coating during drying. Suitable solvents are glycol ethers such as ethylene glycol monobutyl ethers (Butyl Cellosolve), diethylene glycol monobutyl ether, diethylene glycol dibutyl ether, dipropylene glycol monomethyl ether, propylene glycol monomethyl ether, and a mixture of mono-, di-, tri- propylene glycol methyl ethers. More importantly, the solvent acts as a coupler with the deformer which is a necessary part of the coating composition. By a coupler is meant that the solvent aids in dispersing and maintaining the dispersion of the defoamer in the aqueous bath of the invention. The solvent is preferably used in amounts to provide in the baths from about 3.0 gm/liter to 6.0 gm/liter. Larger amounts of solvent of up to about 54 gm/liter can be used before coating failure occurs, but provide no particular advantage.

Because of the tendency of the baths to foam excessively, a defoamer must be employed. Unexpectedly, many defoamers form a slime-like solid at the air bath interface and are unsuitable. We found that α-hydro-omega-hydroxypoly(oxyethylene)poly(oxypropylene)-poly(oxyethylene) block copolymers were compatible with the bath components, were dispersed by the solvent, did not form a slime, and were effective defoamers at the preferred operating temperature range of 70° F.-120° F. Such materials are marketed under the trademark PLURONIC ® by the BASF Wyandotte Corporation. The preparation of such materials is described, for example, in U.S. Pat. No. 2,674,619. The defoamer is used in amounts to provide in the bath from about 0.67 gm/liter to 5.3 gm/liter with a preferred range of 0.67 gm/liter to 1.3 gm/liter.

In order to further illustrate the invention, the following specific examples are provided. These examples are illustrative and are not intended to limit the scope of the present invention.

In Examples 1 to 5, aluminum beverage containers were precleaned by employing a 5-second ambient tap water rinse followed by an alkaline cleaning, water rinse, and an alkaline etch bath. The cleaned containers were uniformly sprayed with the aqueous coating composition at a temperature of 90° F. for a period of 30 seconds.

The coating can also be applied by other conventional means such as by dipping the containers in the coating solution. The coating weight is primarily a function of the concentration of acrylic polymer in the coating composition so that overspraying, such as may occur during line stoppages, does not adversely effect the quality of the coatings. This is an advantage over conventional conversion acidic coating processes. The coating solution is used at ambient temperatures, e.g. 70°-120° F. Temperatures at which excessive loss of ammonia occurs should be avoided.

After the coating solution was applied, the containers were dried for 3 minutes in an air circulating oven at 350° F.

The drying could be done at ambient temperature and no adverse effect on coating properties was noted up 600° F. At a drying temperature of 600° F., some discoloration occurs.

EXAMPLE 1

A coating composition was prepared using the following components:

| Component | Quantity |
|---|---|
| $Ca(NO_3)_2.4H_2O$ | 0.67 gm/l |
| $NH_4OH$ (conc) | 3.00 gm/l |
| Dimethylaminoethanol (DMAE) | 2.94 gm/l |
| Acrylic polymer[1] | 6.33 gm/l |
| Butyl Cellusolve[2] | 3.01 gm/l |
| Defoamer[3] | 0.67 gm/l |

[1]CARBOSET 514H B.F. Goodrich, thermoplastic ethyl acrylate-methyl methacrylate-methacrylic acid terpolymer milky-white dispersion, 40% by weight in ammonia water, pH 7.0, acid number 65, molecular weight 30,000.
[2]ethylene glycol monobutyl ether
[3]PLURONIC L-61 BASF Wyandotte α-hydro-omega-hydroxy-poly(oxyethylene)-poly(oxypropylene)poly(oxyethylene) block copolymer.

The components were added to a six liter bath of deionized water. Clean aluminum containers were coated by spraying and oven drying as described above. The coating weight was about 5 mg per container (2⅛" diameter×5" long; total coated area about 88 sq. inches). The coating was uniform and the container surfaces remained bright and without any etching or distortion. The coated containers were further evaluated using the following water stain and paint adhesion tests.

WATER STAIN RESISTANCE TEST (TR-4 CORROSION)

The test purpose is to determine the water stain resistance of container exteriors. A TR-4 test solution is prepared which simulates those bath conditions employed in the pasteurization process. The composition of the test solution includes 82.4 ppm sodium chloride, 220 ppm sodium bicarbonate, and 2180 ppm DUBOIS 915 cleaner - (DUBOIS 915 is a proprietary product supplied by DuBois Chemicals, Inc.) Test samples are immersed in this test solution for 30 minutes at 150° F. ±5° F. After testing, the sample is removed, rinsed with deionized water and oven dried. The sample is visually evaluated for discoloration. Any dark or irregular stain is unacceptable. A light uniform discoloration is acceptable. Test samples are rated from 1 (no staining or discoloration) to 5 (dark gold or grey-black discoloration).

A coated container from Example 1 was tested as follows: The container side walls are separated from the container bottom and the bottom was subjected to the Water Stain Resistance Test. The container bottom was evaluated and showed no evidence of stain.

DETERGENT IMMERSION PAINT ADHESION TEST

This test is a measure of the adhesion between an organic finish and a coated substrate. A finished surface is immersed in a boiling test solution for 15 minutes. The samples are removed, rinsed, and dried. The samples are inspected for blush. Cross hatch marks are made on the surface and a 1 inch wide Scotch-brand transparent tape (#610) is applied to the cross-hatched area. The tape is removed with one quick motion and the coating examined for removal or blistering.

The test solution is made up using deionized water and contains per 3 liters of solution 21 ml of TR-1 reagent (10 ml phosphoric acid to 1 liter ORVIS K ®️ detergent; ORVIS K is a product of Proctor & Gamble), 1.0 gram each of magnesium sulfate and calcium chloride, and 0.5 gram of calcium carbonate.

A coated container from Example 1 was tested as follows: The coated container side walls were painted with a water based clear base coat supplied by Glidden Chemicals using a Fisher-Payne Dip Coater operated at its lowest speed. The side walls were oven cured for 4 minutes at 410° F. The coated sample containers were subjected to the paint adhesion test and the coating was not removed or blistered when the tape was stripped from the cross-hatched surface.

The appearance of the coated containers was excellent, with the coating being clear, uniform and bubble-free.

EXAMPLE 2

Coating solutions were prepared using the same components and quantities as in Example 1 except that the percent of acrylic polymer solids in the solutions was varied to provide weight percent levels in the coating composition of 0.01%, 0.025%, 0.05%, 0.10%, 0.15%, 0.20%, 0.5%, and 0.75% (0.1 to 7.5 gm/liter). Clean aluminum containers were spray coated with the solutions using the process described above. The appearance of the coated containers was examined and they were subjected to the Water Stain Resistance Test. The container coated with the 0.01% and 0.025% polymer solid containing solutions failed the Water Stain Resistance Test. The containers coated with the 0.5 and 0.75% polymer solid solutions failed the appearance test in that the coating was not uniform with runs and drips being evident. The other concentrations provided acceptable results. A preferred working concentration range is between about 0.05 and 0.25 percent by weight of polymer solids (0.5 to 2.5 gm/liter).

EXAMPLE 3

Coating solutions were prepared as in Example 1 using various calcium salts so as to provide a working calcium in concentration of 0.113 gm/liter. The salts used were calcium sulfate, calcium chloride, calcium acetate and calcium formate. All the coated aluminum containers coated with the solutions passed the Water Stain Resistance Test.

EXAMPLE 4

A coating solution was prepared as in Example 1 except that 0.66 gm/liter of $Mg(NO_3)_2.6H_2O$ was used in place of the calcium nitrate. Aluminum containers coated with the solution passed the Water Stain Resistance Test.

EXAMPLE 5

A solid, thermoplastic, acrylic polymer (acid number 80, molecular weight 260,000, CARBOSET 525) was added to ammonium hydroxide to form a soluble ammonium salt and used in the formulation according to Example 1 in place of the CARBOSET 514H resin solution. Satisfactory coatings were obtained using this formulation.

An attempt was made to use zinc and zirconium to crosslink the coatings. Zinc ammonium carbonate (12.5 wt. % zinc oxide) and zirconium ammonium carbonate (20 wt. % zirconium oxide) complex solutions were used in the formulation according to Example 1 in place of the calcium nitrate in amounts of from 0.67 gm/liter to 10.67 gm/liter. All the coated containers coated with these solutions failed the Water Stain Resistance Test.

EXAMPLE 6

Containers of black plate steel were cleaned by a 5 second pre-rinse in water followed by treatment with an alkaline cleaner. After a water rinse, the containers were uniformly coated with the coating composition described in Example 1 by spraying them with the composition at a temperature of 90° F. for 30 seconds and then drying for 3 minutes in an air circulating oven at 350° F. The coated metal surfaces were rust-free and ready for the application of a coating lacquer.

When black plate steel containers were cleaned and oven-dried without the application of the coating, flash rusting occurred on the can surfaces, especially in the dome area.

The foregoing has described compositions for forming corrosion-resistant coatings on metal substrates such as aluminum and black plate steel containers which coatings are non-toxic, easy to apply, effective at low coating weights, and which meet corrosion resistance, adhesion and appearance requirements.

We claim:

1. An aqueous, alkaline coating composition comprising water, greater than about 0.25 gm/liter and less than about 5.0 gm/liter of composition of a water soluble salt of an acrylic polymer which contains carboxyl groups, a divalent metal ion which is effective to crosslink the acrylic polymer, a volatile base, and a defoamer.

2. The coating composition of claim 1 wherein the volatile base is ammonium hydroxide.

3. The coating composition of claim 1 wherein the defoamer is a α-hydro-omega-hydroxy-poly(oxyethylene)poly(oxypropylene)poly(oxyethylene) block copolymer.

4. The coating composition of claim 1 which includes a volatile amine as a film forming aid.

5. The coating composition of claim 4 which contains from about 2.9 gm/liter to about 47 gm/liter of amine.

6. The coating composition of claim 1 which includes a glycol ether solvent.

7. The coating composition of claim 6 which contains from about 3.0 gm/liter to about 54 gm/liter of said glycol ether solvent.

8. The coating composition of claim 1 which contains from about 0.018 gm/liter to about 0.452 gm/liter of said divalent metal ion.

9. The coating composition of claim 1 which contains from about 0.240 gm/liter to about 2.0 gm/liter of said volatile base.

10. The coating composition of claim 1 having a pH of from about 8.5 to about 11.0.

11. The coating composition of claim 1 wherein the acrylic polymer is a terpolymer of ethyl acrylate, methyl methacrylate and methacrylic acid having from about 3 to 15 weight percent of carboxyl functionality and a molecular weight from about 30,000 to 260,000.

12. The coating composition of claim 1 wherein the defoamer is present in an amount of from about 0.67 gm/liter to about 5.3 gm/liter of composition.

13. The coating composition of claim 1 which contains from about 0.50 gm/liter to about 2.5 gm/liter of said acrylic polymer.

14. A process for forming a corrosion resistant coating on a metal substrate comprising coating the surface of the substrate with an aqueous alkaline composition comprising water, greater than about 0.25 gm/liter to less than about 5.0 gm/liter of composition of a water soluble salt of an acrylic polymer which contains carboxyl groups, a divalent metal ion which is effective to crosslink the acrylic polymer, a volatile base and a defoamer so as to form a dry, crosslinked acrylic polymer coating on said surface.

15. The process of claim 14 wherein the composition is at a temperature of from about 70°–120° F.

16. The process of claim 14 wherein the coating is dried and crosslinked by heating.

17. The process of claim 14 wherein the substrate is coated by spraying.

18. The process of claim 14 wherein the metal substrate is aluminum or steel.

19. The process of claim 14 wherein the composition includes a divalent metal ion selected from the group consisting of magnesium or calcium.

20. The process of claim 14 wherein the volatile base is ammonium hydroxide.

21. The process of claim 14 wherein the defoamer is a α-hydro-omega-hydroxy-poly(oxyethylene)poly(oxypropylene)poly(oxyethylene block copolymer.

22. The process of claim 14 wherein the composition includes a volatile amine as a film forming aid.

23. The process of claim 22 wherein the composition contains from about 2.9 gm/liter to about 47 gm/liter of amine.

24. The process of claim 14 wherein the composition includes a glycol ether solvent.

25. The process of claim 24 wherein the composition contains from about 3.0 gm/liter to about 54 gm/liter of said glycol ether solvent.

26. The process of claim 14 wherein the composition contains from about 0.018 gm/liter to about 0.452 gm/liter of said divalent metal ion.

27. The process of claim 14 wherein the composition contains from about 0.240 gm/liter to about 2.0 gm/liter of said volatile base.

28. The process of claim 14 having a pH of from about 8.5 to about 11.0.

29. The process of claim 14 wherein the acrylic polymer is a terpolymer of ethyl acrylate, methyl methacrylate and methacrylic acid having from about 3 to 15 weight percent of carboxyl functionality and a molecular weight from about 30,000 to 260,000.

30. The process of claim 14 wherein the defoamer is present in an amount of from about 0.67 gm/liter to about 5.3 gm/liter of composition.

31. The process of claim 14 wherein the composition contains from about 0.50 gm/liter to about 2.5 gm/liter of said acrylic polymer.

32. An aqueous, alkaline coating composition comprising water, greater than about 0.25 gm/liter and less than about 5.0 gm/liter of composition of a water soluble salt of an acrylic polymer which contains carboxyl groups, a divalent metal selected from the group consisting of magnesium, calcium and mixtures thereof, a volatile base, and a defoamer which does not form a slime.

* * * * *